2,946,828

PROCESS FOR PREPARING ALIPHATIC FLUORINE COMPOUNDS

Otto Scherer, Heinrich Kühn, and Eberhard Forche, Frankfurt am Main, Germany, assignors to Farbwerke Hoechst Aktiengesellschaft vormals Meister Lucius & Bruning, Frankfurt am Main, Germany, a corporation of Germany No Drawing. Original application Dec. 2, 1957, Ser. No. 699,890. Divided and this application May 4, 1959, Ser. No. 810,586

Claims priority, application Germany Apr. 4, 1952

12 Claims. (Cl. 260—653.7)

This invention relates to a process for preparing aliphatic fluorine compounds and more particularly to such a process in which aluminum fluoride is used as a catalyst.

This application is a division of application Serial No. 699,890, filed December 2, 1957, now abandoned.

It is known that aliphatic fluorine compounds can be prepared by passing hydrogen fluoride and chlorinated hydrocarbons simultaneously over solid metal halides such as the chlorides of copper, silver, gold, zinc cadmium, mercury, vanadium, manganese, iron, cobalt, nickel, or platinum, which metal halides act as catalysts. The catalysts may also be precipitated on carriers in order to form a large catalytically active surface.

In U.S. patent appl. Ser. No. 344,456 filed March 24, 1953, now abandoned, of which this application is a continuation-in-part, we disclosed that especially good yields of highly fluorinated compounds are obtained by using aluminum fluoride as a catalyst at a temperature within the range of 300° C. to 700° C., and especially from 300 to 500° C. Now we have furthermore found that good yields of fluorinated compounds are not only obtained, if the above reaction is carried out at temperatures from 300 to 700° C., but also at a temperature in the range from 200 to 300° C., advantageously above 230° C., in other words, according to the invention vaporous saturated halogenated aliphatic hydrocarbons containing one or more halogen atoms (other than fluorine) and which may additionally contain one or more fluorine atoms, are reacted with hydrogen fluoride vapor in the presence of an aluminum fluoride catalyst at a temperature in the range from 200 to 700° C., advantageously from 230 to 500° C. Surprisingly there is obtained a good yield of fluorinated compounds, not only if the reaction is carried out at a temperature above 300° C., but also in the above mentioned range of temperature below 300° C. The process of the invention is especially advantageous when carbon tetrachloride is used as starting material. However, there may likewise be used other halogenated aliphatic hydrocarbons which are in the form of vapor under the reaction conditions. It is of advantage to carry out the process at as low temperatures as possible, since then the catalyst has a longer lifetime and, therefore, it has to be exchanged less often. Consequently the apparatus can better be utilized. Furthermore the material of the apparatus has a longer lifetime.

These highly fluorinated compounds have many uses among which most notably is their use as refrigerants.

An especially active aluminum fluoride catalyst is obtained by treating metallic aluminum in a form having a large surface, for instance, in the form of chips or filings, with hydrogen fluoride at a raised temperature. Catalysts having the same good activity can be obtained by heating in a current of hydrogen fluoride activated alumina, advantageously in the form of pieces, such as is used for the dehydration of ethanol. Crystalline fused alumina cannot be used as no substantial amount of aluminum fluoride is formed so that practically no catalytic action occurs.

The reaction components are mixed together in the form of their vapors in the desired proportions and introduced into the reaction chamber, which is filled with the catalyst. The reaction vessel may be, for example, a tube made of nickel or steel coated with nickel or any other material which is resistant to hydrogen fluoride at high temperatures.

In general the reaction may be conducted under atmospheric pressure, and in this case the construction of the apparatus and the means for sealing it and supplying it with the reactants are simplified.

The mixture leaving the reaction vessel is freed from acid constituents by washing it with water and a solution of an alkali hydroxide. The reaction products are condensed and separated from one another by fractionation.

The temperature required for the fluorination lies within the range of 200 to 700° C. The higher the temperature the more highly fluorinated are the products formed. The hydrogen fluoride is consumed almost quantitatively, especially if the quantity thereof is kept somewhat below the stoichiometrically calculated amount.

Whereas the use of aluminum fluoride alone generally leads to the production of mixtures of the various possible fluorination products, the relative proportions of the reaction products can be controlled by adding other metal halides to the aluminum fluoride. Thus, the formation of trifluoro-chloro-methane from carbon tetrachloride and hydrogen fluoride can be avoided almost completely by adding a small quantity of magnesium fluoride to the catalyst. If, on the other hand, the formation of trifluoro-chloromethane is to be promoted, the addition of a copper halide has been found suitable. The same result is obtained by mixing the aluminum catalyst with copper chips or filings. It is surprising that, in spite of the addition of copper, which usually promotes the formation of highly fluorinated compounds, no tetrafluoromethane is formed, whereas without addition of copper large quantities of this compound are obtained under otherwise identical conditions. Consequently it is possible by suitably selecting the catalysts to promote the formation of certain fluorination products the formation of which could not be promoted to the same extent by adjusting the stoichiometric proportions of the reactants or by regulating the temperature. A special advantage of the process of the present invention is that it is possible to prevent or diminish the formation of undesirable compounds which cannot be reused as starting materials.

The aforesaid mixed catalysts can be prepared in various ways. Thus, alloys may be used which contain the desired metals as components of the alloy, for example, an alloy of aluminum and copper, or pieces of alumina may be impregnated with a solution of salts of the appropriate metals. In all cases the mixed catalysts should be pre-treated with hydrogen fluoride.

For the manufacture of fluorinated ethane derivatives it is of advantage in some cases to use as starting materials instead of ethane derivatives ethylene compounds and chlorine to form the corresponding ethane derivatives which are then reacted in statu nascendi to yield the desired fluorine containing compounds. For example, trifluoro-trichlor-ethane may be prepared from tetrachlorethylene by reacting it simultaneously with chlorine and hydrogen fluoride.

The following examples serve to illustrate the invention, but they are not intended to limit it thereto.

Example 1

250 grams of hydrogen fluoride vapor are passed in the course of 5 hours at a gradually increasing temperature through a nickel tube having an internal diameter of 5 cm. filled with aluminum turnings and built into an electric oven. Over the catalyst so pretreated there is passed at 300–380° C. (measured at the external wall of the nickel tube) in the course of 18½ hours a mixture of 1135 grams of hydrogen fluoride and 5115 grams of carbon tetrachloride in the form of their vapors. The vapors leaving the reaction tube are washed with water and sodium hydroxide solution, dried with concentrated sulphuric acid, and condensed and fractionated by distillation. The reaction product consists of 56.6 percent of difluoro-dichloromethane, 8.7 percent of trifluoro-chloromethane, 16.8 percent of monofluoro-trichloromethane and 17.9 percent of unreacted carbon tetrachloride. The extent of conversion of the carbon tetrachloride amounts to 86 percent and that of hydrogen fluoride to 96 percent.

Example 2

A nickel tube having an internal diameter of 2.5 cm. and of which a length of 30 cm. is situated in an electrically heated oven, is filled with pieces of activated alumina and heated to 360–400° C. The temperature is measured at the external wall of the reaction tube. Hydrogen fluoride is passed through the tube for about 40 hours. A mixture of the vapors of carbon tetrachloride and hydrogen fluoride in the molecular ratio of 1:1.9 is passed through the tube at the rate of 1 gram molecule of carbon tetrachloride per hour, and a reaction product is obtained which consists of 18 percent of monofluoro-trichloromethane, 43 percent of difluoro-dichloromethane and 19 percent of trifluoro-monochloromethane. 19.5 percent of the carbon tetrachloride used are recovered. The hydrogen fluoride is almost completely consumed.

Example 3

A catalyst of alumina impregnated with a magnesium chloride solution of 60 percent strength (calculated as $MgCl_2.6H_2O$) is fluorinated as described in Example 2. By passing the mixture of carbon tetrachloride and hydrogen fluoride used in Example 2 over this catalyst under the conditions described in that example, a mixture is obtained which consists of 29.4 percent of monofluoro-trichloromethane, 62.8 percent of difluoro-dichloromethane, 1.6 percent of trifluoro-monochloromethane and 6.1 percent of unreacted carbon tetrachloride. The hydrogen fluoride is completely consumed.

Example 4

319 grams of carbon tetrachloride vapor and 119 grams of hydrogen fluoride vapor are passed per hour at 450–500° C. over a mixture of pieces of activated alumina and copper turnings which has been pretreated with hydrogen fluoride for 32 hours while the temperature rose from 80° C. to 500° C. The yields of pure fluorine compounds calculated on the carbon tetrachloride used amount to 82 percent of trifluoro-chloromethane, 10 percent of difluoro-dichloromethane and 3 percent of monofluoro-trichloromethane. 94 percent of the hydrogen fluoride are consumed. Without the addition of copper turnings there are obtained only 54 percent of trifluoro-chloromethane in addition to 17 percent of difluoro-dichloromethane, 12 percent of monofluoro-trichloromethane and about 7 percent of tetrafluoromethane.

Example 5

With the aid of the catalyst described in Example 5 a mixture of 4.07 gram molecules of difluoro-dichloromethane per hour and 4.00 gram molecules of hydrogen fluoride per hour is converted into trifluoro-chloromethane in a yield of 79.5 percent. No tetrafluoromethane is formed.

Example 6

A mixture of 1 gram molecule of tetrachlorethylene, 1 gram molecule of chlorine and 3 gram molecules of hydrogen fluoride is passed, per hour, at 400–450° C. over a catalyst as described in Example 2. 1:1:2-trifluoro-1:2:2-trichlorethane is obtained in good yield in addition to a small amount of 1:2-difluoro-tetrachlorethane and unreacted tetrachlorethylene.

Example 7

Lumpy, porous alumina is treated at 150–300° C. with gaseous hydrogen fluoride (2.5 kg.) in a nickel tube (diameter: 5 cm.; length: 1 m.) in an electrically heated tube furnace. A mixture prepared from 1 mol of chloroform and 3 mols of hydrogen fluoride is passed over the catalyst at 450–480° C. at a rate of 1 mol of chloroform per hour. The yield obtained, calculated upon the chloroform used, is 90% of trifluoromethane, 2.6% of difluoromethane and 6.3% of monofluorodichloromethane. 90% of the hydrogen fluoride is consumed.

Example 8

An aluminum fluoride catalyst is prepared from 800 grams of aluminum chips by treatment with hydrogen fluoride as described in Example 1. Over the catalyst so obtained is passed, at 500° C., per hour, a mixture prepared from 187.5 grams of trifluorotrichlormethane and 40 grams of hydrogen fluoride. The reaction products leaving the tube are washed with water and sodium hydroxide solution, dried with concentrated sulfuric acid and fractionated. 73% of the trifluorotrichlorethane is reacted. There are obtained, calculated upon the reacted trifluorotrichlorethane, 18.6% of hexafluorethane, 31.8 of pentafluorochlorethane and 49.6% of tetrafluorodichlorethane.

Example 9

A nickel tube having an internal diameter of 2.5 cm. and of which a length of 35 cm. is situated in an electrically heated oven, is filled with pieces of porous alumina impregnated with a solution of 60% strength of magnesium chloride. It is heated to 250° C. (the temperature is measured at the external wall of the nickel tube), and a current of gaseous hydrogen fluoride is passed through the tube for 20 hours at 200–250° C. Then a gaseous mixture of 1 mol/h of carbon tetrachloride and 1.86 mols/h of hydrogen fluoride is passed through at 230–250° C. The composition of the reaction product so obtained is as follows:

1.45 percent by weight of trifluoro-monochloromethane
81.2 percent by weight of difluoro-dichloromethane
12.5 percent by weight of monofluoro-trichloromethane
4.25 percent by weight of carbon tetrachloride
99.40 percent by weight.

We claim:

1. A process for the manufacture of saturated aliphatic fluorine compounds by replacing halogen by fluorine, which process comprises reacting hydrogen fluoride, at a temperature within the range of about 200° C. to 700° C. and in the presence of aluminum fluoride containing in addition magnesium fluoride as a catalyst, with saturated halogenated aliphatic hydrocarbons containing at least one halogen atom other than fluorine.

2. A process for the manufacture of saturated aliphatic fluorine compounds by replacing halogen by fluorine, which process comprises reacting hydrogen fluoride, at a temperature within the range of about 300° C. to 700° C. and in the presence of aluminum fluoride containing in addition magnesium fluoride as a catalyst, with saturated halogenated aliphatic hydrocarbons containing at least one halogen atom other than fluorine.

3. A process for the manufacture of saturated aliphatic fluorine compounds by replacing halogen by fluorine, which process comprises reacting hydrogen fluoride, at a temperature within the range of about 300° C. to 700° C. and in the presence of aluminum fluoride, containing in addition magnesium fluoride, as a catalyst, with saturated halogenated aliphatic hydrocarbons containing at least one halogen atom but free from fluorine.

4. A process for the manufacture of saturated aliphatic fluorine compounds by replacing halogen by fluorine, which process comprises reacting hydrogen fluoride, at a temperature within the range of about 300° C. to 500° C. and in the presence of aluminum fluoride containing in addition magnesium fluoride as a catalyst, with saturated halogenated aliphatic hydrocarbons containing at least one halogen atom but free from fluorine.

5. A process for the manufacture of saturated aliphatic fluorine containing compounds which comprises reacting at a temperature within the range of about 300° to 500° C. a halogenated ethylene which contains at least one halogen atom different from fluorine with chlorine and hydrogen fluoride in the presence of aluminum fluoride containing in addition magnesium fluoride as catalyst, whereby the chlorine adds to the ethylene to form a saturated ethane, the hydrogen fluoride then reacting with the ethane to introduce a fluoride atom in place of one of said halogen atoms different from fluorine.

6. A process for the manufacture of saturated aliphatic fluorine compounds by replacing halogen by fluorine which process comprises reacting tetrachloro ethylene with chlorine and hydrogen fluoride at a temperature within the range of about 300 to 500° C. in the presence of aluminum fluoride containing in addition magnesium fluoride, whereby the chlorine adds to the tetrachloro ethylene to form hexachloro ethane, the hydrogen fluoride then reacting with the hexachloro ethane to introduce at least one fluorine atom in place of chlorine.

7. A process for the manufacture of difluorodichloromethane which comprises reacting hydrogen fluoride and carbon tetrachloride at a temperature in the range from about 200° to 700° C. in the presence of aluminum fluoride containing in addition magnesium fluoride as a catalyst.

8. A process for the manufacture of difluorodichloromethane which comprises reacting hydrogen fluoride and carbon tetrachloride at a temperature in the range from about 300° to 700° C. in the presence of aluminum fluoride containing in addition magnesium fluoride as a catalyst.

9. A process for the manufacture of difluorodichloromethane which comprises reacting hydrogen fluoride and a carbon tetrahalide which contains at least 2 chlorine atoms and at least one further halogen atom other than fluorine at a temperature in the range from about 300° C. to 700° C. in the presence of aluminum fluoride containing in addition magnesium fluoride as a catalyst.

10. A process for the manufacture of saturated aliphatic fluorine compounds for replacing halogen by fluorine, which process comprises reacting hydrogen fluoride, at a temperature within the range of about 300° C. to 700° C. and in the presence of aluminum fluoride containing in addition magnesium fluoride and having been obtained by passing hydrogen fluoride over small pieces of an alloy aluminum and magnesium at a raised temperature, as a catalyst, with saturated halogenated aliphatic hydrocarbons containing at least one halogen atom but free from fluorine.

11. A process for the manufacture of saturated aliphatic fluorine compounds for replacing halogen by fluorine, which process comprises reacting hydrogen fluoride, at a temperature within the range of about 300° C. to 700° C. and in the presence of aluminum fluoride containing in addition magnesium fluoride and having been obtained by passing hydrogen fluoride at a raised temperature over pieces of porous alumina, impregnated with a magnesium salt, at a raised temperature, as a catalyst, with saturated halogenated aliphatic hydrocarbons containing at least one halogen atom but free from fluorine.

12. A process for the manufacture of saturated aliphatic fluorine compounds by replacing halogen by fluorine, which process comprises reacting hydrogen fluoride, at a temperature within the range of about 300° C. to 700° C. and in the presence of aluminum fluoride containing in addition magnesium fluoride as a catalyst, with saturated halogenated aliphatic hydrocarbons containing at most two carbon atoms and at least one halogen atom other than fluorine.

References Cited in the file of this patent

UNITED STATES PATENTS

| | | |
|---|---|---|
| 2,744,147 | Milks | May 1, 1956 |
| 2,744,148 | Ruh et al. | May 1, 1956 |
| 2,748,177 | Miller et al. | May 29, 1956 |
| 2,755,313 | Calfee et al. | June 17, 1956 |

FOREIGN PATENTS

| | | |
|---|---|---|
| 770,640 | Great Britain | Mar. 20, 1957 |